(12) United States Patent
Elliott

(10) Patent No.: US 6,210,446 B1
(45) Date of Patent: Apr. 3, 2001

(54) FIBER TREATMENT FOR APPLICATION OF PROTECTIVE FILM

(76) Inventor: Ryan K. Elliott, 4 W. Dry Creek Cir., #145, Littleton, CO (US) 80120

( * ) Notice: Subject to any disclaimer, the term of this patent is extended or adjusted under 35 U.S.C. 154(b) by 0 days.

(21) Appl. No.: 09/425,327

(22) Filed: Oct. 21, 1999

Related U.S. Application Data

(60) Provisional application No. 60/105,183, filed on Oct. 22, 1998.

(51) Int. Cl.[7] ................. B32B 7/06; B32B 7/10; B32B 7/12; D06M 13/192; D06M 23/14
(52) U.S. Cl. ............... 8/115.6; 427/154; 427/155; 427/282; 427/407.1; 427/412; 156/247; 156/344; 156/314; 118/505; 150/154; 150/158
(58) Field of Search ............... 8/115.6; 428/154, 428/155, 282, 407.1, 412; 156/247, 344, 314; 118/505; 150/154, 158

(56) References Cited

U.S. PATENT DOCUMENTS

| | | |
|---|---|---|
| 4,203,859 | 5/1980 | Kirn et al. . |
| 4,623,413 * | 11/1986 | Questel et al. ............ 156/247 |
| 5,952,409 | 9/1999 | Boardman et al. . |

* cited by examiner

Primary Examiner—Yogendra Gupta
Assistant Examiner—Brian P. Mruk
(74) Attorney, Agent, or Firm—Kyle W. Rost

(57) ABSTRACT

Carpet masking film is reliably and removably applied to used carpet of unknown condition. In a pretreatment, the carpet is cleaned by physical separation of visible debris, followed by chemical or solvent cleaning of grease and soluble factors, restoring the carpet to a clean appearance. A primer layer is applied over the clean carpet fiber in quantity sufficient to establish a barrier and separation layer on top of the carpet fiber. Subsequently, a sprayed adhesive layer is applied over the primer layer. A carpet masking film is applied over the surface of the sprayed adhesive. The masking film may carry its own adhesive layer, which is applied to the sprayed adhesive to create a bonded sandwich structure that is removable as a unit with the masking film.

6 Claims, 1 Drawing Sheet

FIBER TREATMENT FOR APPLICATION OF PROTECTIVE FILM

This application claims benefit of Provisional No. 60/105,183 filed Oct. 22, 1998.

TECHNICAL FIELD

The application relates to stock material and especially to treating and applying of protective sheeting to stock material. More specifically, the invention relates to method and apparatus for treating a textile stock material having a synthetic pile or nap type surface. The invention is especially applicable to a coating, impregnation, or bond for carpeting.

BACKGROUND ART

As a method of protecting stock materials such as textiles, it is known to apply a layer of protective plastic sheeting, often called carpet masking. In the automobile industry, this technique is used with new automobiles. Sheets of flexible plastic are applied to new automobile carpeting at the factory in order to protect the carpeting and maintain its new appearance until the dealer is ready to deliver the car to a purchaser. At that time, the dealer removes factory-applied protective materials, including the plastic carpet masking film on the carpeting.

The art of applying protective plastic film is technically sophisticated and requires individual analysis of each type of carpeting. As a general practice, each manufacturer must individually adapt the process to each of his specific carpet offerings; and each model year may involve enough variation in the offered carpets that the individual analysis must be repeated and the results modified. The challenging aspect is found in the need to adhere the plastic to the carpeting so that it serves its purpose until time for removal, while at the same time the adhesive must allow the plastic to be removed from the carpeting without leaving residue or causing any damage or discoloration to the carpeting. The types of adhesive that performs adequately is individualized to specific characteristics of the carpeting. Thus, for example, an adhesive formulation may have to be changed to conform to the percentage of specific fibers in the pile, pile length, and density. The choice of plastic sheeting type also may require reformulation.

Only new carpeting has been adequately diagnosed to allow the use of removably adhered plastic sheeting. Used carpeting includes many unknown variables that have prevented use of carpet masking film. One such variable is the composition of the carpet fiber, which tends to be unknown by the time a car enters the used market. Although it would appear possible to research what carpet fiber was supplied in each model of used car, obtaining such information would be pointless. The film and adhesive specifically formulated for the carpet in a used car is unlikely to be in production anymore. Even if the film could be obtained, it likely would not adhere properly, due to the used and unrecoverable condition of the carpet. Consequently, a major problem in adapting carpet masking film to used carpet is that the film and adhesive that once worked when the car was new will not work in the car's later life.

In the used car market, it cannot be reliably predicted that an adhesive will work with even a professionally cleaned, shampooed carpet. Automobile carpet tends to be contaminated with a wide variety of unknown impurities, the full scope of which is limitless. Some of the more commonly anticipated contaminants are sand, dirt and dust of any variety in the pile; waxes, oils, and grease from new or old shoe prints; residual soap, cleaning byproducts and chemicals; food and drink spillage; and salt, fertilizer, and other chemicals used on roads, sidewalks, lawns, and gardens. With the added complication that different fiber compositions and pile characteristics require special adhesives even in the new car market, it is clear that a new technology is needed if refurbished used cars are to reliably benefit from adhered but removable plastic sheeting on their carpets.

Some chemicals or their derivatives that are useful in the present invention have been employed in cleaning products, although the method of use, concentration, or associated preparatory steps apparently have been insufficient to produce the desired result. For example, U.S. Pat. No. 4,203,859 to Kirn et al. teaches a modifier for carpet shampoo that contains acrylic copolymer that may include methacrylic acids and methyl methacrylate. U.S. Pat. No. 5,952,409 to Boardman teaches a stain blocking composition containing methacrylic polymers, which are useful for treating nylon carpet. While these compositions and treatments employing them may be useful in protecting or cleaning carpet, no previously known technique has overcome the specific problems of reliably adhering protective, removable plastic sheets to used carpet.

It would be desirable to have a technology that places used carpeting into a predictable condition so that a single satisfactory process and composition can be used to apply removable, protective plastic sheeting.

To achieve the foregoing and other objects and in accordance with the purpose of the present invention, as embodied and broadly described herein, the method of applying protective plastic sheeting of this invention may comprise the following.

DISCLOSURE OF INVENTION

Against the described background, it is therefore a general object of the invention to provide an improved method of treating used carpeting that reliably allows adhering protective plastic sheeting, while also allowing the clean removal of such sheeting, when desired.

Another object is to provide a system of treating compositions that place used carpeting into a predictable condition such that a preselected plastic sheeting can be removably adhered to the napped surface of the carpeting.

Additional objects, advantages and novel features of the invention shall be set forth in part in the description that follows, and in part will become apparent to those skilled in the art upon examination of the following or may be learned by the practice of the invention.

According to the invention, carpet masking film is reliably and removably applied to used carpeting by, first, applying a primer layer in quantity sufficient to establish a barrier and separation layer on top of the carpet fiber. Second, a sprayed adhesive layer is applied over the primer layer. Third, carpet masking film is applied over the sprayed adhesive layer.

The removable carpet masking film may be of a type having a film adhesive layer carried on one side of the carpet masking film. The step of applying carpet masking film is done by applying the film adhesive layer against the sprayed adhesive layer.

The step of applying a primer is done by applying a methacrylate copolymer. A preferred methacrylate copolymer is octylacrylamide/acrylates/butylaminoethyl methacrylate copolymer. A hair spray containing this copolymer can be applied.

Prior to priming, the carpet can be cleaned by the steps of physically removing from the carpet visually perceivable dirt and solvent cleaning the carpet.

The accompanying drawing, which is incorporated in and forms a part of the specification illustrate preferred embodiments of the present invention, and together with the description, serves to explain the principles of the invention. In the drawings:

BEST MODE FOR CARRYING OUT THE INVENTION

Figure 1:
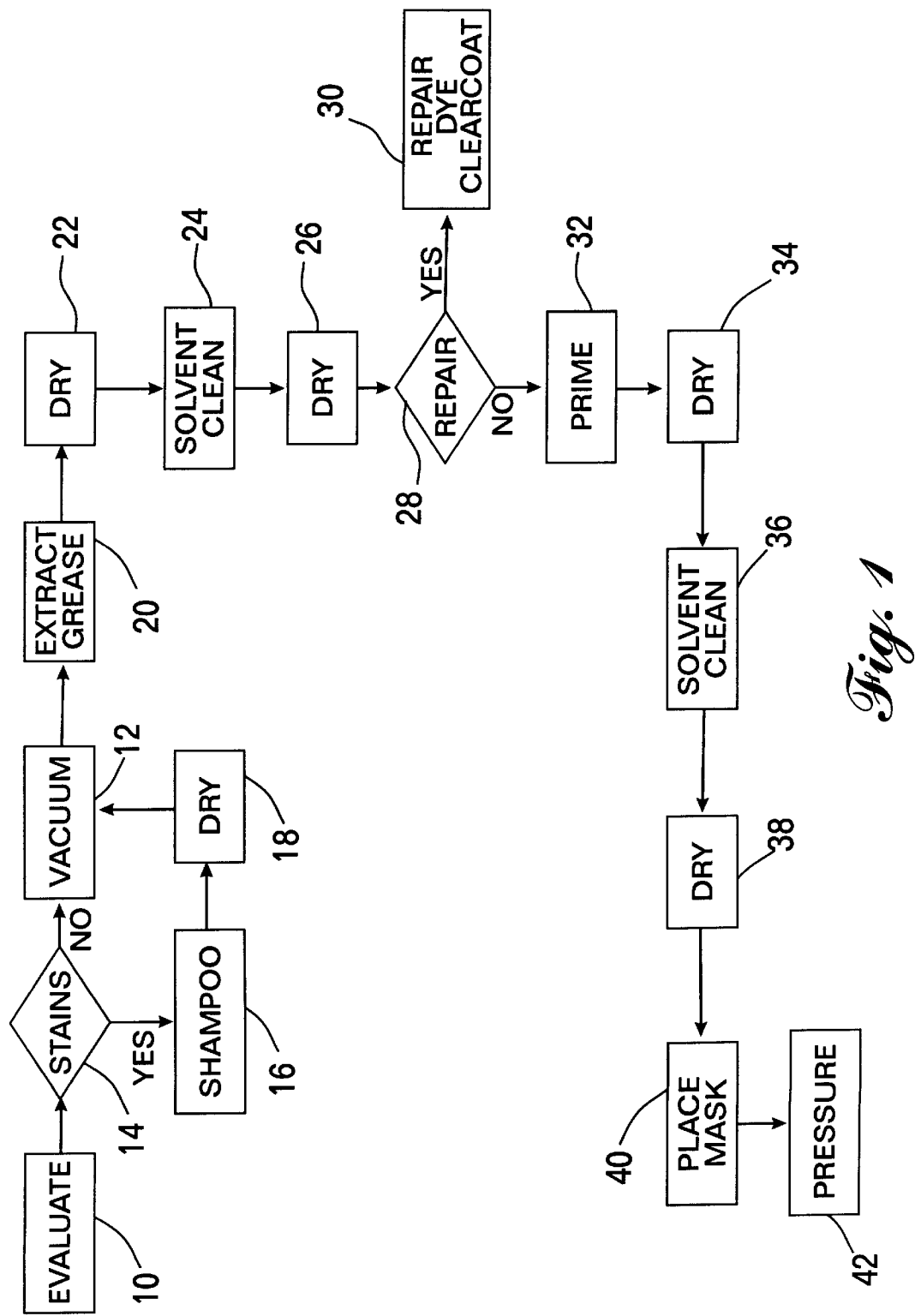
FIG. 1 is a flow chart showing steps performed in the invention.

The invention provides a method of reliably applying a removable carpet masking film to used substantially any automobile carpeting, regardless of its fiber composition. More specifically, the invention provides a treatment for used carpeting, especially carpeting of used cars while still installed in the used car, that reliably permits the adhesive application of protective plastic sheeting, while still allowing such plastic sheeting to be removed without causing damage to the carpeting or leaving behind observable residues. In particular, the invention achieves a plurality of material relationships that produce the desired results. First, the appropriate preliminary cleaning of the carpet prepares the carpet to receive a primer. Second, a suitable primer material is selected for its effectiveness in the environment of used carpeting, to contribute to the holding of a plastic film while allowing its release under suitable tension. Third, the primer must leave no observable residue on the carpet upon removal of the plastic. Fourth, the application of primer must be in an effective manner to permit the primer to carry out its various functions. Fifth, the primer must receive a covering coating of adhesive and support the adhesive, while not being degraded or allowing the adhesive to bond into the carpet fiber. Sixth, the sprayed adhesive coating must receive a carpet masking plastic film that may carry its own adhesive coating. The two adhesives must combine in a strong, sandwich bond, such that both layers of adhesive and the plastic film are removable as a unit. These steps and relationships are explained in detail, below.

With general reference to FIG. 1, the steps in the treatment process allow preliminary and on-going carpet cleaning and restoration by techniques found effective on used carpet, performed in a suitable sequence, which may be varied as required for the specific requirements of each used car. One stage of the preliminary treatment removes loose dirt and debris, while another stage involves cleaning the carpet with selected chemical solvents to remove grease, oils, and other dirt requiring solvent for proper extraction. For purposes of adhering the plastic sheeting, a penetrating treatment primes the carpet to receive adhesive. Thereafter, adhesive is sprayed onto the carpet, and plastic sheeting having an adhesive side is applied over the sprayed adhesive.

The preliminary cleaning is variable in its scope and requirement. The initial step typically may be an evaluation 10 of the condition of the carpet, which dictates how much cleaning will be required to return the carpeting to visually presentable condition. In substantially every case, the cleaning will involve physical removal 12, such as by vacuuming, of loose dirt and debris. Depending upon the findings of the initial evaluation 14, additional wet cleaning or shampoo steps 16 may precede the vacuuming to remove spills and stains. When wet cleaning steps 16 are performed, it is best to allow the carpet to dry 18 before proceeding to the next steps, which involve other solvents.

The carpet pile is further cleaned by applying a degreaser 20, such as by scrubbing with a terry cloth rag wetted with Clean-All brand degreaser, available from Professional Auto Detail Supply, Inc., Denver, Colo. The preferred quantity of scrubbing will continue until no further dirt visibly transfers to the rag from any portion of the carpet. Use of white rags is recommended to aid in the determination of when the carpet is adequately clean. When the carpet is adequately clean, it is allowed to dry 22 by evaporation of the degreaser, such as for 30 minutes at 70° F.

Next, solvent cleaning is continued by application of a lacquer thinner 24, using a similar technique and white terry cloth rags. One such lacquer thinner is known as product no. 1013, available from Paint and Lacquer Co., Englewood, Colo. The components include light aliphatic solvent naphtha, toluene, methyl ethyl ketone, n-butyl acetate, acetone, n-butanol, and isopropanol. Sufficient lacquer thinner is used to penetrate the pile to the carpet backing. Scrubbing is continued until no further dirt transfer to the rag is observed. The carpet then is allowed to thoroughly dry 26, such as for one hour.

After treatment with lacquer thinner, it is suitable evaluate the need for repairs 28, such as by performing additional conventional cosmetic and repair steps 30 as may be desired. These include repairing holes, dying stains, and applying clear coat to any uncured pigment. Such steps are not critical to the invention but are optional.

Once the carpet is sufficiently clean, as would be achieved by the cleaning steps mentioned above, a primer is applied 32 to the carpet in order to enable the desired subsequent adhesion and removability. The primer is required to perform several functions. First, it must provide a barrier layer so that subsequently applied adhesive does not substantially bond into the carpet fibers. Second, it must provide a separation layer between the carpet fiber and the adhesive, so that when removal is desired the plastic can be pulled off the carpet without damage to the carpet. Third, the primer must not be visible or, upon removal of the plastic, must not leave behind visible residue. In addition, the primer should be acceptable as a residue on the carpet, since some may remain after the carpet masking film is removed. Yet, sufficient primer must be applied to perform the first two functions. Thus, the selection and application of a suitable primer and a suitable vehicle for delivery of the primer are important to the overall success of this method.

It has been found that various components used in known commercial products have the newly discovered ability to serve as primer for adhesive on used carpet, prior to application of adhesive and carpet masking film. A surprising commercial source for the primer is a formulation generally known as hair spray. Two brands that have been found especially effective are Paul Mitchell brand and Aqua Net brand. The ingredients of the Paul Mitchell brand are as follow:

PAUL MITCHELL FREEZE AND SHINE SUPER SPRAY: SD alcohol 40 (SDA-CA-2877), deionized water, octylacrylamide/acrylates/butylaminoethyl methacrylate copolymer, aminomethyl propanol, panthenol, benzophenone-3, cocamidopropyl betaine, dimethicone copolyol, triethyl citrate, fragrance.

Of these ingredients, it is believed the solvents and carriers, such as water and alcohol, are useful to deliver the remaining ingredients. Fragrance is believed to be of no importance to this method. The octylacrylamide/acrylates/ butylaminoethyl methacrylate copolymer and the like have been tested and found adequate to provide the effective priming function of this invention.

The method of application and quantity applied of hair spray-based primer is believed to be a significant aspect of the method. The method may be practiced with a one quart air pressure sprayer filled with four ounces of hair spray at 90 psi. The entire carpet is coated liberally, forming a residue barrier between the carpet fiber and the subsequently applied adhesive. The quantity of spray applied should no be so great that the spray is observed to run down the carpet fibers; however, the carpet should appear wet and completely coated. A useful guide is to fan the spray nozzle so that the spray pattern is about six inches wide at one foot from the tip. When the spraying step is complete, the carpet is allowed to dry 34, such as for 20 to 30 minutes.

After the primer layer has dried, the primed areas of carpet that are to be covered by plastic sheeting are sprayed with a light coat of adhesive 36. The adhesive provides a complimentary base for receiving the carpet masking film. Although the film, itself, may carry an adhesive layer, the presence of the sprayed adhesive layer on the carpet provides a predictable reception surface. The sprayed adhesive forms a predictable bond with the primer layer. The bond is known to have necessary durability while being separable when subjected to an acceptable tension. In addition, the spray adhesive is selected for its cohesion and body, so that the primer will separate from the carpet before the cohesion of the adhesive layer fails. Thus, the adhesive layer should be cleanly removed from the carpet when the carpet masking film is removed. Suitable selected adhesives are Bostik brand or Zynolyte Hold It! brand clear adhesive. These adhesive sprays are available in aerosol containers, which are used to apply the spray. The ingredients of the adhesives with CAS number are as follows:

ZYNOLYTE HOLD IT! INGREDIENTS: Petroleum gases, liquified, sweetened (68476-86-8), resin acids and rosin acids, polymerized esters with glycerol (68475-37-6), ligroine (8032-324), heptane (142-82-5), benzene, 1,3-diethenyl-polymer with 1,3-butadiene and ethenylbenzene (2647145-4), benzene, methyl-(108-88-3).

BOSTIK SUPERTAK MIST ADHESIVE: Acetone (67-64-1), Cyclohexane (110-82-7), hexane (110-54-3), benzene 1-chloro-4 (trifluoromethyl) (98-566), isobutane (75-28-5), propane (74-98-6), dimethyl ether (115-10-6).

The coating is sufficiently light as to be non-visible to normal observation. A useful guide is to hold the can about eight inches from the carpet and broadcast the adhesive in a wispy motion, applying only one coat A brief but limited drying step 38, lasting from three to ten minutes is allowed.

Plastic film or sheeting known as carpet masking is available from the Ivex Company. The preferred film is flexible, water resistant, adhesive coated, pressure sensitive, and has high elongation or stretch. The film is prepared for application by pre-cutting into a preselected, convenient size. The type of plastic sheeting typically used for this purpose is manufactured with adhesive on one surface and sold in long rolls with 25 inch width. A preferred cut panel size is 25×25 inches, which well suited for applying one sheet to the carpet of each seating location, such that two sheets normally are applied to the right and left front seating areas, and if desired, two more sheets are applied to the right and left rear seating areas.

The plastic film is efficiently handled in the following steps 40. In order to pre-cut the plastic into panels for application, the desired length is unrolled, placed over a wood surface with adhesive side down, and cut at the preselected dimension. A cleaning towel, as described above, is rolled into an elongated, snake-like shape and placed across the center of the cut panel as a weight. The panel is loosely folded in half with the towel positioned in the fold by bringing one edge over the towel to meet the opposite edge, matching corners of the two edges. The panel is picked-up by the matched pairs of corners and placed with the weighted fold in a resting position on the carpet. The weighted fold serves as a positioning guide along the transverse centerline of the carpet. One side of the panel is flipped forward, i.e., toward the pedals; and the other side is flipped backwards, i.e., toward the seat The weighting rag is removed and, while each corner is held, the plastic is smoothed from the center to the corner. The plastic is firmly pressed 42 both out and down with a flat hand to promote adhesion to the carpet pile.

The adhesive layer on the plastic film, which may be referred to as the film adhesive, has been found to adhere to the carpeting of used cars when applied over the primer with adhesive over-coating. The film adhesive is well suited to adhere to the film, itself. Its ability to adhere to other surfaces may be of varying quality, depending upon the characteristics of such other surfaces. However, the bond between the film adhesive and the sprayed adhesive on the carpet is a firmly united sandwich structure. The two adhesives bond to each other with powerful adhesion. The firmness of the bond ensures that the film, the film adhesive, and the sprayed adhesive will be removed substantially entirely as a unit with the film. The film is adequately attached for normal handling, including test driving the used car. Yet, the sheeting is removable by pulling it free of the carpeting. Upon removal, the film leaves behind no normally observable adhesive or other residue on the carpeting. The customer receives the used car with the carpeting appearing substantially as clean and in as good shape as when the preliminary cleaning steps were completed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention.

I claim:

1. A method for reliable application of removable carpet masking film to used carpeting, comprising:

first, applying a primer layer in quantity sufficient to establish a barrier and separation layer between the carpet and subsequently applied adhesive;

second, applying a sprayed adhesive layer over the primer layer; and third, applying carpet masking film to the surface of the carpet over said sprayed adhesive layer.

2. The method of claim 1 for reliable application of removable carpet masking film to used carpeting, wherein said carpet masking film is of a type having a film adhesive layer carried on one side of the film, and said step of applying carpet masking film further comprises:

applying the film adhesive layer against said sprayed adhesive layer.

3. The method of claim 1 for reliable application of removable carpet masking film to used carpeting, wherein said step of applying a primer layer comprises:

applying a methacrylate copolymer.

4. The method of claim 1 for reliable application of removable carpet masking film to used carpeting, wherein said step of applying a primer layer comprises:

applying octylacrylamide/acrylates/butylaminoethyl methacrylate copolymer.

5. The method of claim 1 for reliable application of removable carpet masking film to used carpeting, wherein said step of applying a primer layer comprises:

applying a hair spray containing a methacrylate copolymer.

6. The method of claim 1 for reliable application of removable carpet masking film to used carpeting, further comprising, prior to said step of applying a primer layer, the steps comprising:

physically removing from the carpet visually perceivable dirt; and solvent cleaning the carpet.

* * * * *